United States Patent [19]
Konzal

[11] Patent Number: 5,337,622
[45] Date of Patent: Aug. 16, 1994

[54] MULTI-MANDREL PROGRAMMABLE TURRET APPARATUS AND METHOD OF EFFECTING TIME MODULATION THEREOF

[75] Inventor: Daryl R. Konzal, Colgate, Wis.

[73] Assignee: Paper Machinery Corporation, Milwaukee, Wis.

[21] Appl. No.: 714,972

[22] Filed: Jun. 13, 1991

Related U.S. Application Data

[63] Continuation of Ser. No. 255,972, Oct. 11, 1988, abandoned.

[51] Int. Cl.⁵ ............................................. B23B 29/24
[52] U.S. Cl. .................... 74/813 R; 74/813 L; 74/53
[58] Field of Search ............ 74/813 R, 813 L, 53, 74/567; 29/66, 233; 408/35; 414/744 R, 552, 749

[56] References Cited

U.S. PATENT DOCUMENTS

| | | | |
|---|---|---|---|
| 2,045,390 | 6/1936 | Howe . | |
| 3,170,375 | 2/1965 | Weidauer | 90/15.1 |
| 3,881,362 | 5/1975 | Beezer | 74/53 |
| 3,974,705 | 8/1976 | Wittkamp | 74/53 |
| 4,271,727 | 6/1981 | Brems | 74/813 R |
| 4,554,723 | 11/1985 | Repella | 29/430 |
| 4,667,531 | 5/1987 | Kato et al. | 74/813 R |

FOREIGN PATENT DOCUMENTS

| | | |
|---|---|---|
| 1237407 | 10/1967 | Fed. Rep. of Germany . |
| 1297321 | 6/1969 | Fed. Rep. of Germany . |
| 861847 | 3/1961 | United Kingdom . |

*Primary Examiner*—Vinh T. Luong
*Attorney, Agent, or Firm*—Foley & Lardner

[57] ABSTRACT

A mechanically programmed indexing turret assembly configured to independently position each of a plurality of mandrels about a central axis of the turret for periodic interaction with a plurality of work stations. A central standard rotates at a substantially constant angular velocity. Each mandrel is mounted about the axis of the standard for rotation about a common axis therewith. The standard selectively transmits torque to the various mandrels in conjunction with cam and linkage elements. The respective periods of angular acceleration, deceleration, and absolute dwell of the respective mandrels are controlled in accordance with a predetermined cam contour associated with the cam track.

38 Claims, 6 Drawing Sheets

MULTI-MANDREL PROGRAMMABLE TURRET APPARATUS AND METHOD OF EFFECTING TIME MODULATION THEREOF

This is a continuation of application Ser. No. 07/255,972, filed Oct. 11, 1988, now abandoned.

BACKGROUND OF THE INVENTION

1. Technical Field

The present invention relates, generally, to methods and apparatus for time management of manufacturing machinery to improve productivity and, more particularly, to methods and means for time modulation of a multi-mandrel programmable turret so that the mandrels are serially placed in operative association with various work stations positioned about the orbit of the mandrels. A specific implementation of the present invention concerns methods and apparatus for a cup making machine, wherein a turret is rotated at a constant angular velocity while workpieces engaged by the mandrels experience intermittent periods of acceleration, deceleration, and absolute dwell with respect to the work stations in a controlled manner vastly improving throughput while reducing machine fatigue.

2. Description of the Background Art and Technical Problems

Machines comprising intermittently rotatable turrets arranged to convey workpieces to positions or stations where operations are performed by or on the workpieces are generally known. See, e.g., Dearsley U.S. Pat. No. 2,512,922, issued Jun. 27, 1950. Of particular relevance to a preferred implementation of the present invention is the use of indexing turrets in paper cup making machines, for example, as embodied in the PMC-1000 High Production Automatic Paper Cup and Paperboard Can Machine, made by the Paper Machinery Corporation of Milwaukee, Wis.

The PMC-1000 comprises a transfer turret, a mandrel turret and a rimming turret, all synchronously driven in a step-wise manner ("indexed") by a single main drive shaft rotating at a constant angular velocity. Each turret has a number of orbital elements, e.g. mandrels, projecting radially outward from an upright rotatable post. By its stepwise rotation, the mandrel turret carries each mandrel, seriatum, to each of a number of work stations positioned about the mandrel orbit for performing a sequence of predetermined manufacturing steps on a workpiece carried by each mandrel.

Each work station is also operatively associated with a main drive shaft, resulting in synchronous interaction among the mandrels and work stations. Typically, one drive shaft revolution constitutes one machine cycle, during which each work station performs a particular task on the workpiece associated with a given mandrel. During continuous operation of a paper cup making machine, each cup must engage each work station once, the number of work stations on a particular machine being a function of the complexity of the finished cup. Hence, one cup is produced per machine cycle. Conventional multiple turret machines produce between 60 and 200 cups per minute (CPM).

The mandrel turret on the PMC-1000 has eight mandrels equally spaced about its vertical standard. Positioned about the common orbit of the mandrels are six to eight work stations for performing discrete tasks on the workpiece (e.g., paper) carried by each mandrel.

At the first station, the bottom portion of the cup is placed on the outward facing flat end of the mandrel and retained by, for example, a vacuum line communicating with the distal end of the mandrel. Commensurate with the next revolution of the drive shaft, the entire mandrel turret is rotated 45 degrees (360 degrees divided by eight mandrels) so that each mandrel simultaneously moves into engagement with the next work station.

A device called a reformer contacts the circular paper bottom at the second station and bends the periphery thereof slightly away from the not-yet-assembled drinking surface of the cup. The reformed bottom is then transferred to the third station where a preheated paper sidewall is folded and clamped around the mandrel and paper bottom. The bottom is heated at the fourth station.

"In-curl" is performed at the fifth station and involves curling the sidewall over the pre-folded portion of a bottom blank. At the sixth station, in the referenced machine a knurling station, the sidewall and bottom are sealed together and squared. At the seventh station, the workpiece is transferred from the mandrel turret to the rimming turret for further processing of the workpiece. After transferring a workpiece to the rimming turret at the seventh station, the mandrel advances to the first mandrel turret station to receive another bottom piece. When the rimming turret operations are completed, the finished cup is exhausted from the machine and stacked for packaging.

Many variations of the above-described process are routinely employed to satisfy unique requirements of different cup design such as, for example, placing a plastic collar on the rim of each cup. Because of space the rim of each cup. Because of space and other mechanical constraints, a maximum of 10 mandrels or work stations may be associated with each turret. Otherwise, the work stations become too crowded, resulting in interference between moving components. Similar limitations impact the ability to adapt current turret designs regardless of the manufacturing process to be performed or the product to be manufactured; these constraints are not unique to cup making.

To ensure that each work station engages and performs its specified task on each workpiece at the appropriate time, the myriad of mechanical apparatus and the turrets with which they cooperate are typically driven by a common main drive shaft. This arrangement leads to heretofore unappreciated implications in certain machine designs.

Horsepower is transmitted from the drive shaft at various points along its length by, for example, belts, pulleys, chains, or gears which supply power to, inter alia, the mandrel turret, rimming turret, blank (sidewall) feeder, sidewall grippers, sidewall folding wings, paper clamp, seam clamp, bottom maker, bottom reformer, bottom heat gun, bottom in-curl, bottom finish, tamper, and rimmer. As many of these mechanisms rotate, index, extend and retract, they bleed horsepower from the drive shaft during some portion of each machine cycle. As a consequence of mechanical inertia these same components often supply horsepower to the drive shaft during other portions of each cycle. Inasmuch as the drive shaft is both constrained to rotate at a constant angular velocity (1–4 revolutions per second) and experiences loading and unloading at various points along its length, the cyclic torques supplied by and imparted to the drive shaft become significant. The mandrel transfer, and rimming turrets, for example, require a combined peak torque of approximately 950 ft.-lbs. to advance from one station to the next. Approximately 400 ft.-lbs. (peak) of torque is supplied by and imparted to the drive shaft by the mandrel turret alone.

The fact that different components interact with the drive shaft at various points along its length results in two interrelated phenomena.

First, while certain apparatus bleed horsepower from the drive shaft at a particular point in each cycle, other components supply horsepower to the shaft at the same point in the cycle. This results in a degree of cancellation of the torque effects upon the drive shaft; the net effect being that the instantaneous torque supplied or absorbed by the drive shaft is less than the sum of the absolute magnitudes of the various torque-absorbing and torque-supplying elements. For a typical machine operating at 200 CPM (200 cups per minute equals $3\frac{1}{3}$ revolutions per second in a 1:1 machine, as is the exemplary one described above), peak net torque values on the drive shaft range between 775–800 ft.-lbs. supplied and between 700–725 ft.-lbs. absorbed per revolution.

The second phenomenon occurs when the drive shaft simultaneously supplies torques of different magnitudes to a plurality of components coupled to the drive shaft at different points along the length thereof. The application of torques having different magnitudes to differential cross sectional elements of the drive shaft causes "winding" of the drive shaft. Winding can create large, cyclic, torsional stresses and vibrations within the drive shaft.

The combination of high differential torques and the cyclic nature of the loading is capable of producing tremendous cyclic strains in the drive shaft. To prevent material failure, a drive shaft must be of sufficient strength and cross sectional area to effectively distribute the internal loads. Likewise, drive shaft speeds should not exceed a design maximum if undesirably excessive torques are to be prevented.

On the other hand, because the cup-forming operations described above are synchronized with respect to the drive shaft, cup production is a function of shaft speed. The design goal, dictated by commercial practicality and highlighted by the significant investment represented in such a machine, is to maximize the number of cups produced per unit time. Since one cup is produced per drive shaft revolution, the design goal is to maximize drive shaft speed. The difficulty encountered, however, is the fact that torque is a function of the square of the shaft speed. Thus, for a given machine, twice the amount of torque is necessary to yield 282 CPM as is required to yield 200 CPM.

Increasing cup production requires an analysis of drive shaft torque. From first principles, torque is equal to the vector product of force times lever arm. The lever arm is the distance from the axis of the drive shaft to the point at which the drive shaft interacts with the component with respect to which force is being supplied or delivered. For purposes of this analysis, the turrets (mandrel, rimming, and transfer, where applicable), because of their necessarily large mass, impact most significantly on drive shaft torque. Thus, the point on the drive shaft which interacts with a turret is of primary concern.

As discussed above, conventional indexing turrets cooperate with the drive shaft attended with great force. To maintain mechanical precision, the drive shaft gears ("discs") which drive the turrets have relatively large masses. As a result, the distance "r" (from the axis of the drive shaft to the point at which a disc interacts with a turret) for a turret-driving disc is largely dictated by design constraints for given turret forces and drive shaft material properties. The focus, then, becomes the force component of drive shaft/turret torque.

Force is equal to mass times acceleration. In effect, the turret force acting on the drive shaft is a function of the mass distribution of the turret and the angular acceleration imparted to it. Mechanical considerations, particularly strength and vibration characteristics, dictate or are significantly influencial factors respecting the mass of a given turret. Therefore, drive shaft torque can be reduced to the extent turret acceleration can be reduced.

Acceleration is the time derivative of velocity, or the rate at which the velocity (in this case angular velocity) of the turret increases or decreases. In a conventional indexing turret, the mandrels maintain a fixed position with respect to each other and with respect to the turret. As such, the entire turret must be accelerated and decelerated each time the mandrels advance to the next work station. This is a consequence of the fact that precision interaction between workpieces and work stations often requires absolute registration therebetween, i.e., absolute mandrel dwell—otherwise, production quality tends to suffer. As drive shaft speed increases, the torque required to accelerate and decelerate the mass of the turret increases.

It has been suggested by Hoerauf, a German machine manufacturing concern located in the Federal Republic of Germany, that higher drive shaft speeds and higher turret speeds may be achieved if the drive shaft is not required to accelerate and decelerate the turret. Because acceleration is the rate of change of velocity, a turret rotating at a constant velocity, regardless of the magnitude of that velocity, requires no torque (except that required to overcome frictional forces). The heretofore intractable problem with this approach involves establishing absolute registration between the mandrel (carried by a constantly rotating turret) and a work station.

Hoerauf has further suggested a constantly rotating turret for transferring a workpiece from one turret to another. However, either the absolute dwell between the mandrel and the work station must be compromised, or the work station must trace a constant-radius arc about the axis of rotation of the mandrel during the period of engagement. The former is unacceptable for many precision operations; the latter involves extensive additional mechanical complexity and significantly increased space requirements. Thus, neither approach is a satisfactory solution to the general problem, and neither reflects an understanding or appreciation of the underlying problem or its causes.

Others have suggested, albeit in radically different contexts, disposing a plurality of workpieces about the periphery of a rotating wheel. A work station, positioned proximate the orbit of the workpieces, interacts with the workpieces as the wheel rotates.

U.K. Patent No. 2,127,766, published Apr. 18, 1984 and entitled "An Apparatus For Wrapping Sweets", discloses a conveyor wheel mounted on a central drive shaft, having radially extending arms with holding jaws for receiving a workpiece. A jaw retrieves a workpiece at a work station and carries it ninety degrees to a second station where the workpiece is transferred to a perpendicularly disposed pair of jaws. The action of the conveyor wheel is such that, during the reception of the workpiece from the first work station as well as during the delivery thereof to the second work station, the holding jaws are said to observe a "stand-still" relative to the moving conveyor wheel. The apparent dwell of the holding jaws is brought about through the action of a roller lever, which rolls in a cam track disposed about the central axis of the conveyor wheel, itself rotating an adjusting shaft in the opposite sense, thereby causing a so-called "retrogressive coaxial swinging out of the holding jaws". Although the jaws are temporarily biased so that they do not rotate about the axis of the wheel, a necessary consequence is that the workpiece moves radially outward during the period of angular dwell.

Dunn U.S. Pat. No. 2,468,255, issued Apr. 26, 1949 and entitled "Feed Device", discloses a feed turret for transferring a workpiece to a main turret. The feed turret is provided with up to six or more sets of lever mechanisms which are hingedly connected to and disposed symmetrically about the main axis of the feed turret. The distal end of each lever system comprises an object-carrying means. The main turret likewise includes a plurality of object-carrying devices, reciprocable in the main turret member and symmetrically disposed about the central axis thereof. The feed turret transfers an object to the main turret as the two corresponding turret devices pass each other, or experience "transferring registration," which extends for approximately 25 degrees of travel. In addition, a dwell zone is provided during a period in which an operator loads the workpiece onto the feeder turret. Through the interaction of two stationary cams and a series of levers and followers, transferring registration and dwell are effected without interrupting turret rotation. However, because the lever mechanisms do not pivot about the axis of rotation of the turret, each object-carrying means rotates about its own axis during dwell. Thus, a condition of absolute dwell, essential to many precision operations, cannot be obtained via the teachings of the '255 patent.

U.K. Patent No. 2,069,440, published Aug. 26, 1981 and entitled "Improvement in Wrapping Machines," discloses a transfer wheel which rotates about a shaft within a frame. A cam track is rigidly secured to the frame. A plurality of arms are pivotally mounted on a spindle secured to the transfer wheel. As the wheel rotates, the arms, biased by the cam track, can accelerate or decelerate with respect to the transfer wheel or bunch up or space apart with respect to each other, as desired. However, as the arms accelerate or decelerate, their distances from the axis of the transfer wheel necessarily increases or decreases.

Similarly, Zambomi U.S. Pat. No 4,511,027, issued Apr. 16, 1985 and entitled "Method and Apparatus for the Handling of Products by Operative Means Carried in Continuous Movement," discloses a pair of continuously rotating spoked wheels, there being blocks slidably mounted on the spokes. The wheels are aligned so that a workpiece carried by a block on one wheel may be transferred to the corresponding block of the mating wheel as the blocks undergo transferring registration. Although the blocks experience relative dwell with respect to each other, they do not experience dwell with respect to their own hub or a fixed point in space.

All of these devices have several common features. For example, the rotating wheels are disposed to interact with one or two work stations. For a workpiece which must interact with at least six to eight work stations, this would require a plurality of mandrel turrets. In addition, a relatively large period of time is required to move a workpiece into engagement with a work station, as compared to the period of time a workpiece experiences engagement with a work station.

To the extent that the goal of increasing cup production depends on increasing shaft speed, the manner of eliminating or compensating for the increased torques heretofore associated therewith has eluded the industry. An awareness of the previously unappreciated subtle effects of increased torques and an understanding of the advantages to be derived from absolute mandrel dwell are critical to the implementation of cost effective production enhancement techniques.

SUMMARY OF THE INVENTION

1. Identification of the Problem

The speed at which a conventional cup making machine may be driven is primarily limited by the ability of the drive to withstand large torsional loads which are produced as the turrets are indexed. It has now been learned, however, that more subtle, secondary factors affect the speed at which a machine may be operated: harmonically forced vibrations due to the cyclic character of the indexing loads. It has been determined in accordance with one aspect of the present invention that cyclic winding of the discs relative to each other, as discussesd above, can produce heretofore undetected acceleration reversals in the drive shaft as drive speed increases. Increasing the capacity of a drive shaft to withstand torsional stresses, thereby facilitating increased drive shaft speed, may only exacerbate the harmonically forced vibration phenomenon. It being difficult to assess system response to such vibrations, it has further been determined that drive shaft torque reduction, as opposed to compensation, is the appropriate design objective.

That being said, reduction of the contribution to drive shaft torque due to any particular parameter is uniquely problematic. The preferred approach to reduce total drive shaft torque is elimination of the torque due to the plurality of turrets. Succinctly, the problem resides in designing a mechanical system which simultaneously satisfies the following divergent goals: 1) reduce drive shaft torque (particularly important in view of the elusive nature of the harmonic vibrations); 2) increase shaft speed; 3) maintain multiple station turret configuration; and 4) maintain absolute mandrel dwell.

Having identified the problem, however, the solution is by no means apparent.

2. SUMMARY OF THE SOLUTION

In another aspect of the present invention, substantial benefits have been determined to derive from the development of a mechanically programmed mandrel (or plurality thereof) to achieve absolute dwell, that is, relative dwell with respect to the rotating turret and absolute dwell with respect to a fixed point in space. This may be accomplished in accordance with a preferred implementation of the present invention, by disposing a plurality of mandrels for circular motion about the axis of rotation of the associated turret, and providing control means, responsive to the rotation of the turret, for advancing or retarding the angular velocity of the mandrels with respect thereto. More particularly, a highly preferred embodiment includes a cylindrical column, or standard, rotatably disposed within a stationary frame; a generally flat, circular hub is rigidly secured to the standard; a plurality of transfer members are pivotably mounted within and about the periphery of the hub; a flat plate, or cam disc, is rigidly secured to the frame, so that the disc remains stationary as the standard, hub, and transfer members rotate at a constant angular velocity; and a cam track of predetermined contour is provided on the surface of the cam disc. A plurality of mandrels are rotatably mounted about the axis of the central standard. A series of mechanical links connect the transfer member to both the mandrel and the cam track. As the turret (standard and hub) rotates about the axis of the central standard, each transfer member pulls a link, having a cam follower at one end thereof, around the cam track. As the cam follower traces the cam contour, the associated link connecting the transfer member to a mandrel advances or retards the motion of the mandrel with respect to the hub.

When a mandrel moves at the same rate and opposite sense as the hub (and hence the transfer member), the mandrel experiences absolute dwell in a polar coordinate system. This is a consequence of the fact that each mandrel is disposed to move about the axis of the turret (standard).

Accordingly, methods and apparatus are provided whereby production rates may be greatly enhanced by positioning workpieces for engagement with work stations in a manner which minimizes the time in which a work station is not performing its specified function upon a workpiece. Workpieces may be advanced to subsequent work stations while other workpieces remain operatively engaged with different work stations. Moreover, because the mandrel turret rotates at a substantially constant rate, system torque is dramatically reduced.

Other advantages and applications of the present invention will become apparent, and a fuller understanding gained, by reference to the following detailed description of the invention, taken in conjunction with the drawing figures, wherein:

DETAILED DESCRIPTION OF PREFERRED EXEMPLARY EMBODIMENTS

A specific implementation of the present invention relates to a paper cup making machine wherein a turret is rotated at a constant angular velocity while workpieces carried by the mandrels experience intermittent periods of angular acceleration, deceleration, constant angular velocity, and absolute dwell with respect to the hub and with respect to the work stations in a manner which vastly improves throughput while simultaneously reducing machine fatigue. The ensuing description will be made with reference to this preferred embodiment, those skilled in the art appreciating that such a description is meant to be exemplary only.

Figure 1:
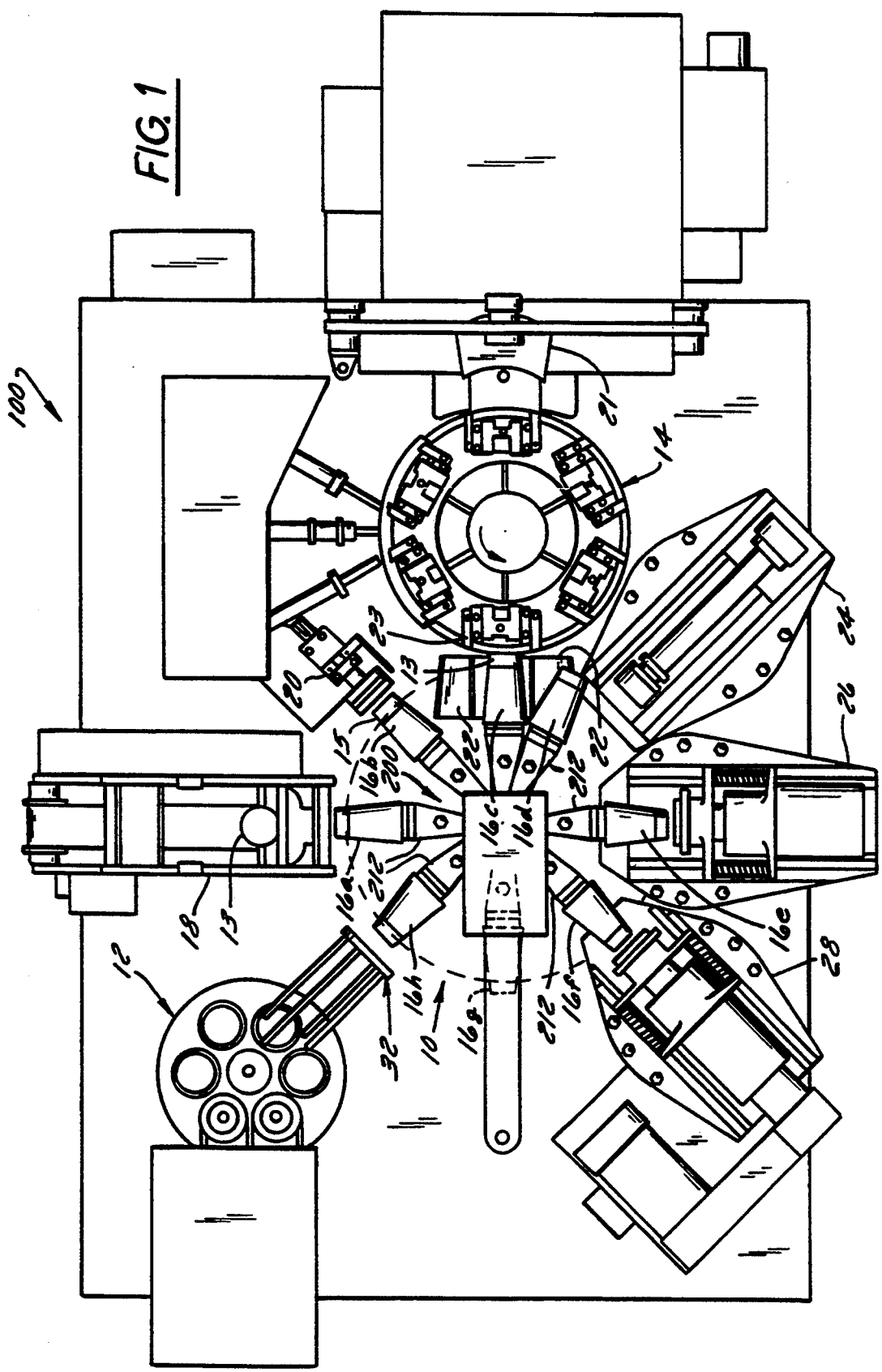
FIG. 1 is a top plan view of a turret in accordance with the present invention shown in operative association with a paper cup making machine including a plurality of work stations.

Referring now to FIG. 1, a paper cup making machine, generally indicated as 100, preferably includes a mandrel turret 10, a rimming turret 12, a transfer turret 14, and a series of work stations disposed about the periphery, or orbit, of mandrel turret 10. Mandrel turret 10 suitably includes a plurality of radially extending arms 212, having appropriately configured mandrels 16 attached thereto (in this case, cup-shaped), rotatably mounted to a central shaft, or standard, best viewed in FIG. 4. Each mandrel 16a–16g constitutes a site upon which a workpiece, e.g. a paper cup, is mounted during assembly thereof.

The cup-making process begins at the bottom-making station 18, wherein a bottom 13 is placed on the outward-facing flat portion of mandrel 16. The mandrel then advances to the bottom reformer station 20 to fold the periphery 15 of the circular bottom to conform to the taper of the sidewall. Subsequently, the mandrel, having the reformed bottom attached thereto, advances to side wall blank feeder station 23 wherein a paper sidewall 21 is folded around mandrel 16 by a pair of folding wings 22. Thereafter, the workpiece is serially brought into engagement with the bottom heating station 24, a roller in-curl station 26, and a knurling station 28. The workpiece is then removed at an exhaust station 32 for either packaging or further processing at rimming turret 12. For a more complete discussion of subsystem functions see Konzal, et al., U.S. Pat. No. 4,490,130 issued Dec. 25, 1984 entitled "Machine for Forming Seams of Two-piece Paper Cups."

As discussed in greater detail below, the manner in which mandrels 16 are advanced between successive stations is fundamentally different from that of a conventional indexing system. In a conventional indexing system, the entire turret is "indexed" such that all mandrels, which are rigidly secured to the turret, simultaneously advance from their respective stations to the next, adjacent station. This step-wise process is repeated continuously so that each mandrel engages each station once per 360 degree turret rotation As previously discussed, the entire combined mass of the turret and mandrels must be accelerated and decelerated each time the mandrels are collectively indexed to the next station. Consequently, during mandrel advancement, all work stations are dormant, i.e., none of the work stations engages a workpiece during the indexing period.

Contrariwise, the turret system of the present invention employs a gait concept, wherein the serial advancement of a particular mandrel from one station to the next is substantially independent of the rotation of the turret. Accordingly, a turret employing this principle may be programmed such that the respective periods during which each work station interacts with a workpiece are staggered by a predetermined amount of time. As a result, the total time in which the work stations are not in operative association with a mandrel may be minimized.

Figure 2:
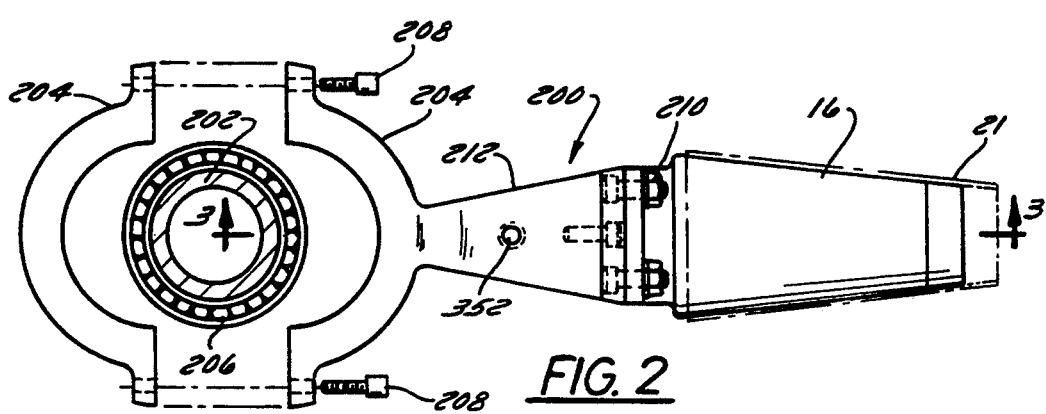
FIG. 2 is a partially exploded top view of a mandrel and bracket assembly.

Referring now to FIG. 2, mandrel 16 is rigidly attached to a bracket assembly 200 which facilitates rotatable mounting of mandrel 16 to the central standard 202 of turret 10. Bracket assembly 200 suitably comprises respective upper and lower supports 204, best aviewed in FIG. 4. Although a single support may be employed, respective supports 204 help stabilize mandrel 16 during dwell to enhance the degree of precision with which mandrel 16 interacts with a work station. A bracket bearing 206 allows bracket assembly 200 to freely rotate about standard 202. Respective bracket fasteners 208 secure supports 204 to bearing 206. An arm 212 extends radially outward from standard 202 and is fastened to mandrel 16 by an arm fastener 210. Fasteners 208 and 210 can be screws, rivets, bolts, or welds, for example. A pivot bore 352, for receiving a mandrel pivot bar 350 (not shown in FIG. 4, but see FIG. 2), is disposed in arm 212.

Alternatively, arm 212 may be operatively associated with a track (not shown), comprising one or more rails forming a circular path around standard 202. Each mandrel 16a–16g may be disposed to roll around the track in a manner similar to rail cars on a railroad track, in lieu of bearing 206, in a manner known to those skilled in the art. In this way, each mandrel may be rotatably mounted about the axis of standard 202, regardless of the mounting method employed.

Figure 3:
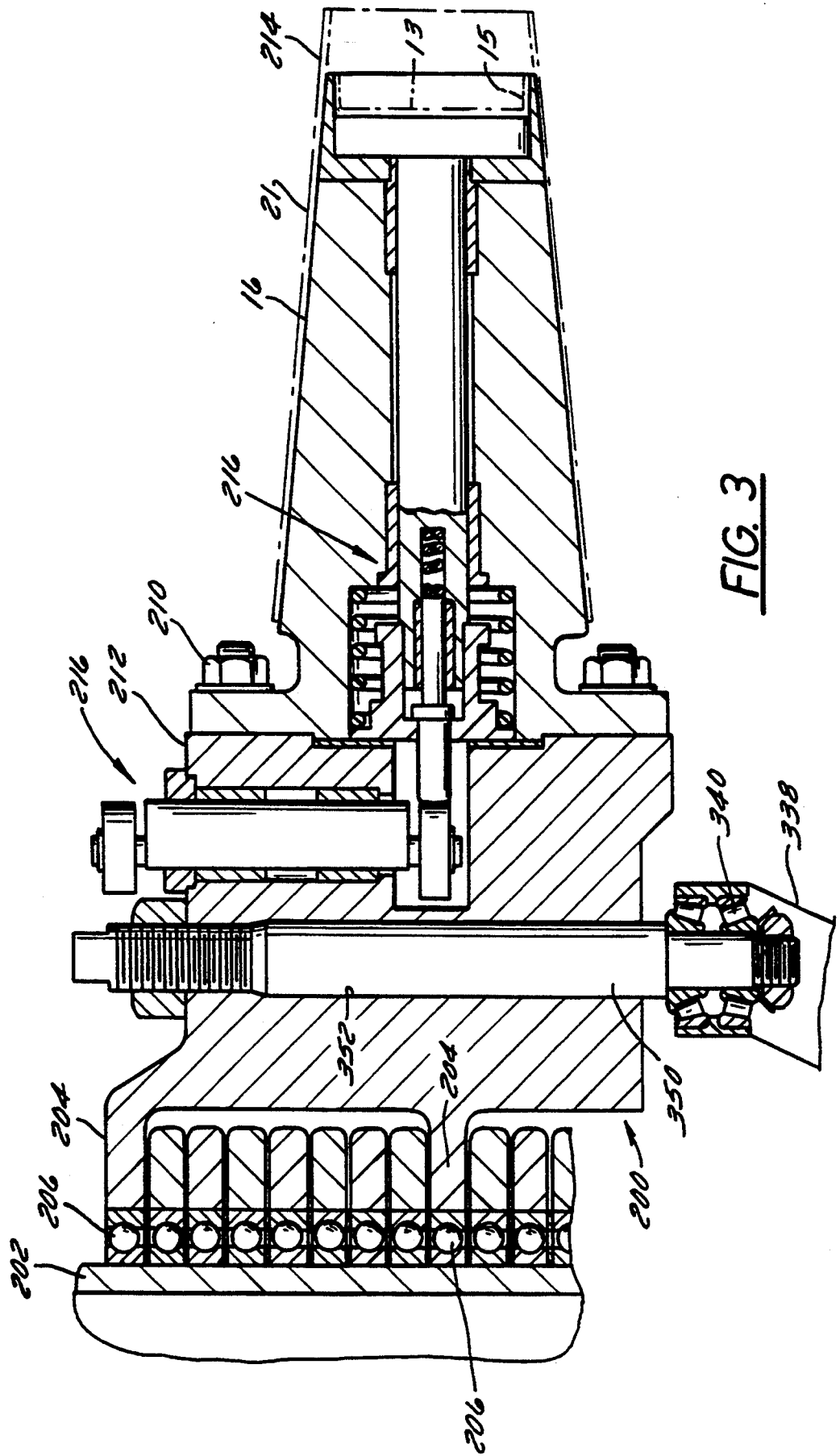
FIG. 3 is a sectional side view of a mandrel and bracket assembly taken along line 3—3 in FIG. 2.

Referring now to FIG. 3, a workpiece 214, for example a pre-stamped paper sidewall, is shown wrapped around mandrel 16. A cam-operated mandrel plunger assembly 216, fully described in U.S. Pat. No. 4,490,130 (discussed supra), is disposed within mandrel 16 and bracket assembly 200 to facilitate various cup-forming operations. As best seen in FIG. 3, the double support 204 configuration enhances mandrel stability in the vertical plane; horizontal stability is discussed below. Omnidirectional stability is critical to many precision operations performed by a work station upon workpiece 214.

Figure 4:
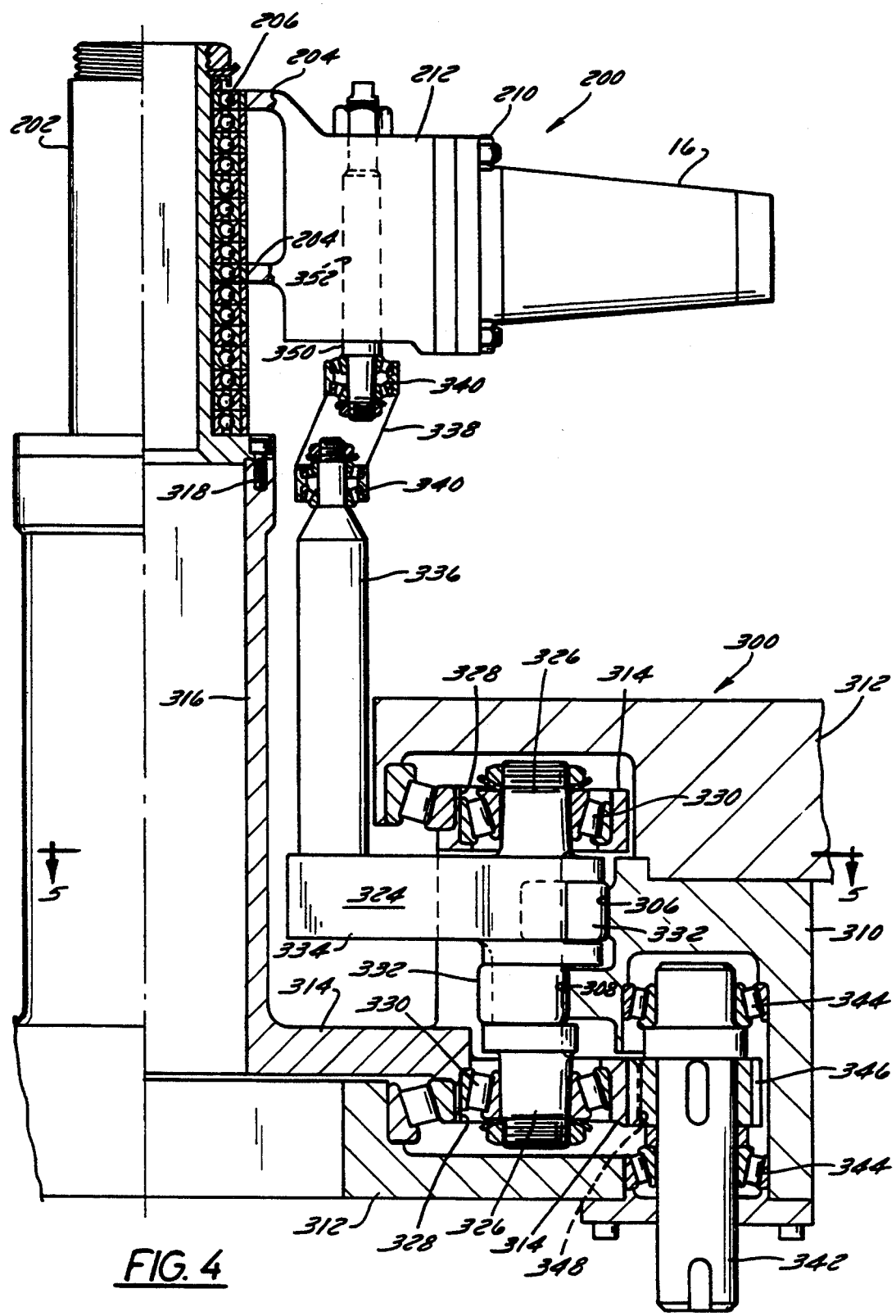
FIG. 4 is a partial sectional view, taken along line 4—4 in FIG. 6, showing a mandrel in operative association with a linkage element, turret hub, and cam.
Figure 7:
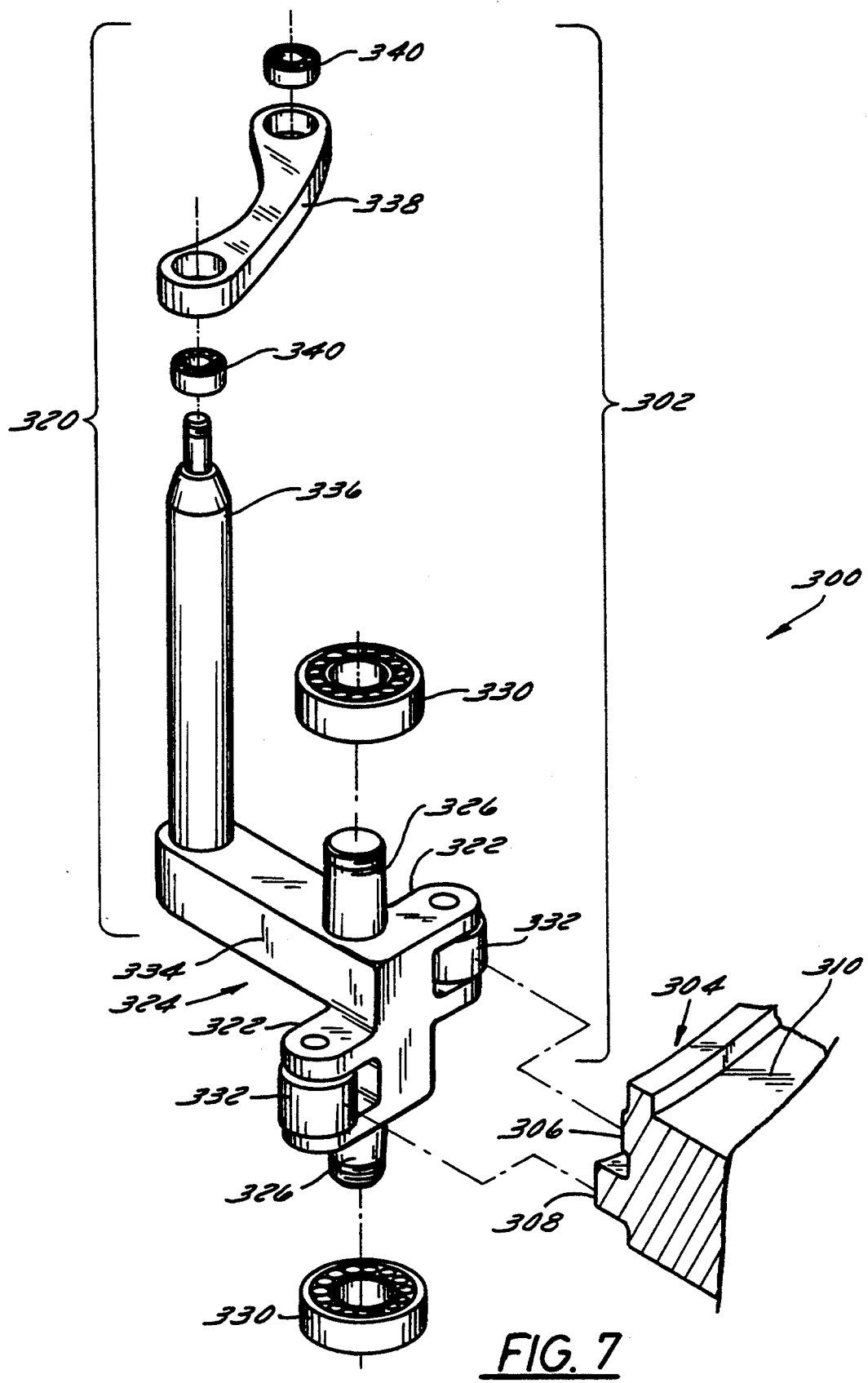
FIG. 7 is an exploded view of the linkage system of FIG. 4.

Referring now to FIGS. 4 and 7, control means 300 programmably controls the position of mandrel 16 about standard 202 to afford precise movement and positioning during operation of the machine. Control means 300 in this instance is illustrated to include linkage means 302 and cam means 304. In a preferred embodiment of the present invention, cam means 304 suitably comprises an upper cam track 306 and a lower cam track 308, both formed in a cam disc 310. Cam disc 310 is rigidly secured to a frame 312 by bolts, welds or any convenient fastener. Alternatively, disc 310 may be integral with frame 312, respective cam tracks 306 and 308 being formed in a portion of the unibody.

A collar 316 is rigidly secured to standard 202 by, for example, a collar fastener 318, which may be a pattern of bolts, a weld ring, or any conventional fastener. Alternatively, collar 316 and standard 202 may be of integral construction. A hub 314, rigidly secured to or integrally formed with collar 316, is disposed to rotate with collar 316 and standard 202 within stationary frame 312. As hub 314 rotates, linkage means 302, which is pivotably mounted within hub 314, engages cam means 304 and thereby positions mandrel 16 in accordance with the contours of cam tracks 306 and 308, as discussed below.

Linkage means 302 preferably comprises a first link 320, respective second links 322, and a transfer member 324. Respective upper and lower projections 326 are disposed on the top and bottom of transfer member 324 for rotatably mounting transfer member 324 within a pivot bore 328 in hub 314. Respective transfer member bearings 330, disposed in pivot bore 328, facilitate pivotal motion of transfer member 324 within hub 314. Respective cam followers 332, disposed at the distal ends of respective second links 322, follow cam tracks 306 and 308, respectively.

As hub 314 rotates with respect to cam disc 310, the vertical axis of projections 326 traces a constant radius arc about the common axis of standard 202 and hub 314. Cam surfaces 306 and 308 interact with respective cam followers 332 to govern the position of a transfer output lever 334. Transfer output lever 334 positions first link 320, which suitably comprises a shaft member 336 and a helical member 338. Helical member 338 is rotatably mounted to shaft 336 and rotatably mounted to a mandrel pivot bar 350 by respective helical member bearings 340. The angular motion of mandrel 16 about standard 202 is thus a function of the mechanical program of cam tracks 306 and 308. This "program" is input to respective second links 322, transferred to transfer output lever 334, and ultimately used to position mandrel 16.

With continued reference to FIG. 4, a driver 342, mounted within cam disc 310 or frame 312 by respective driver bearings 344, imparts angular motion to hub 314. A driver gear 346, mounted to driver 342, engages a hub gear 348 disposed on the periphery of hub 314. Driver 342 is operatively associated with the main drive shaft discussed above in the context of drive shaft torque, such that the turret rotates at a generally constant angular velocity. (The main drive shaft is not shown in the drawing). The gear ratio between driver 342, hub 314, and the main drive shaft should be selected so that the turret makes one revolution about the turret axis for every "n" drive shaft revolutions, "n" being the number of mandrels associated with the turret. In this way, each mandrel is associated with each work station, respectively, for the duration of one 360 degree drive shaft cycle.

Figure 6:
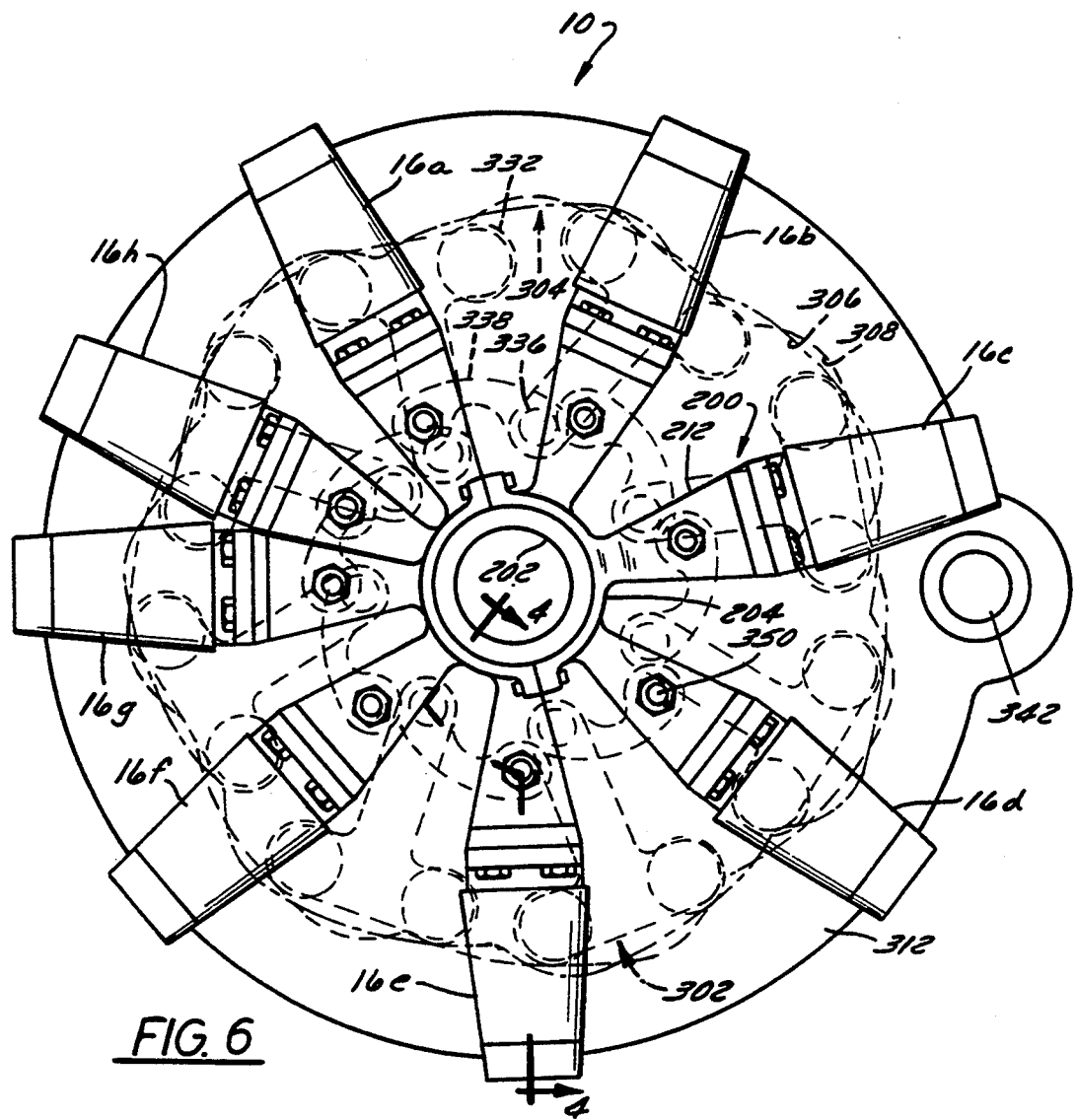
FIG. 6 is a top plan view of the turret of FIG. 1 showing the positions of the mandrels and showing the linkage elements in phantom lines.
Figure 5:
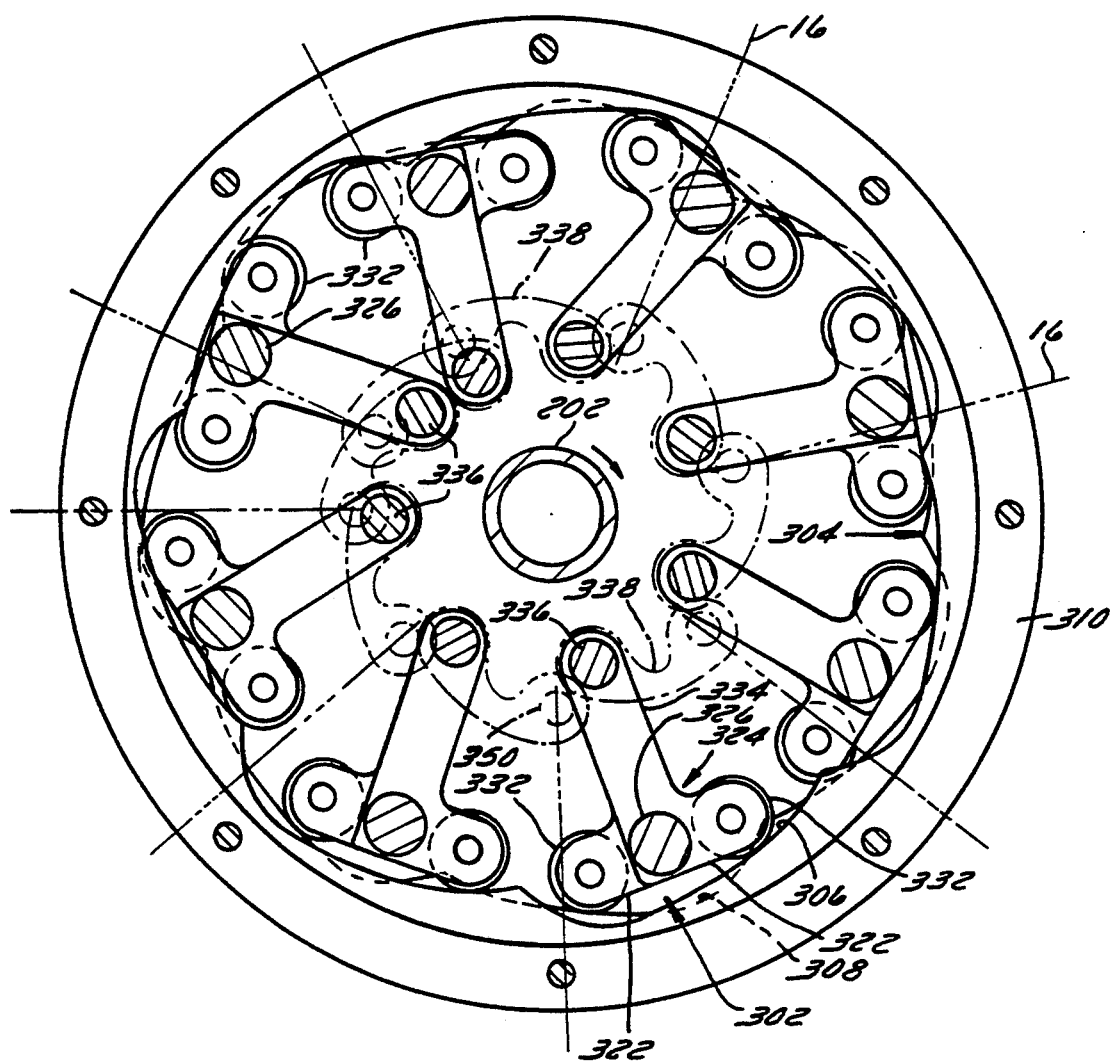
FIG. 5 is a sectional plan view of the hub, cam, and linkage system, taken along line 5—5 of FIG. 4.

Referring now to FIGS. 5 and 6, a plan view of the above-described linkage means shows respective followers 332 engaging cam tracks 306 and 308. Cam tracks 306 and 308 have the same cam contour but are offset by a predetermined phase shift proportional to the distance between centers of respective cam followers 332. Hence, respective followers 332 are always loaded against cam tracks 306 and 308 in this illustrative embodiment.

For each linkage means 302, the distance between the axis of standard 202 and the axis of projection 326 is preferably constant during continuous operation of the apparatus because transfer member 324 is (rotatably) mounted in hub 314. Transfer member 324 pivots about the axis of projections 326, in response to the interaction between followers 322 and cam tracks 306 and 308, thereby positioning transfer output lever 334. Transfer output lever 334 causes first link shaft 336 to trace a constant radius arc about the axis of projection 326. Helical member 338, which is pivotably connected to mandrel pivot bar 350, causes mandrel 16 to rotate about the axis of standard 202.

In a conventional indexing turret, the mandrels are rigidly connected to the hub of the turret so that each mandrel rotates about the central turret axis. Every mandrel rotates one degree for each degree of turret rotation. In a turret in accordance with the preferred embodiment of the present invention, the mandrels rotate about the central axis of the turret but are not rigidly attached thereto. Rather, the rotation of hub 314 is imparted to respective first mandrel 16a, second mandrel 16b, etc. by control means 300 associated with each mandrel. Specifically, control means 300 imparts programmed, intermittent periods of angular acceleration, angular deceleration, and dwell to said mandrel. Turret rotation is biased in accordance with cams 306 and 308, and the resulting controlled motion is imparted to each mandrel.

For example, in a preferred embodiment of the present invention, cams 306 and 308 are programmed so that the rotation of each mandrel is alternately advanced and retarded with respect to the rotation of the turret. When the turret rotates clockwise, each projection 326 moves about the axis of standard 202 at the same rate and in the same sense as the turret. When the interaction of cams 306 and 308 with respective second links 322 cause transfer member 324 to rotate counterclockwise, the movement of the associated mandrel about the turret axis is advanced (accelerated) with respect to the turret. The slope of the cams determine the rate of the acceleration. Similarly, when transfer member 324 rotates about the axis of projection 326 in a clockwise direction, mandrel advancement is retarded (decelerated) with respect to turret rotation. Again, the rate of deceleration is a function of cam slope. When cams 306 and 308 are programmed such that the deceleration imparted to mandrel 16 causes it to orbit about the turret axis counterclockwise at the same angular velocity at which the turret is rotating clockwise, mandrel 16 experiences absolute dwell with respect to a fixed point in space. Stated another way, the cams and linkages cooperate to apply a variable torque to each mandrel, the magnitude of the variable torque varying in accordance with, inter alia, the cam track contour.

In a preferred embodiment, standard 202, collar 316, and hub 314 rotate together at a constant angular velocity. If, on the other hand, it is desirable to rotate the turret at a variable angular velocity, cams 306 and 308 may be programmed in accordance with the variable speed input to advance or retard the mandrels as desired. Given the principles set forth herein, development of suitable cam profiles to achieve a desired program is well within the skill of the art; and, likewise, guided by these same principles, the skilled artisan may find nonmechanical means to implement this function (e.g., electronically).

In an alternate embodiment, a single cam may be employed in lieu of the upper/lower configuration shown in FIGS. 4 and 7. In that event, a double-sided cam track is employed, there being a minimum amount of clearance between the follower and each side of the track. In another alternate embodiment, a single, one-sided cam track is employed, the follower being loaded against the cam track by, for example, a stiff spring. In still another variant, each mandrel has a cam follower secured thereto. A plurality of cams are pivotably mounted to the hub or the frame so that each follower interacts with successive cams as the turret rotates. As a particular follower terminates engagement with one cam, it initiates engagement with the adjacent cam. The cams position the follower, which in turn positions the mandrel. In the above-mentioned alternate embodiments, the amount of follower clearance and the stiffness of the spring should be selected to ensure sufficient stability, in the horizontal plane, of the distal end of the associated mandrel during dwell to accommodate precision interaction with a work station.

Use of the canter or gait principle in turret applications facilitates the serial, step-wise advancement of workpieces to orbital work stations for engagement therewith during intermittent periods of absolute mandrel dwell. The mandrels, which constitute a relatively small portion of the aggregate mass of a turret system, are individually accelerated and decelerated between periods of absolute dwell. The major portion of the mass of the turret, namely the standard, collar, hub, and linkage means, rotates at a substantially constant angular velocity, while the frame and cam disc remain stationary. Consequently, there is a dramatic reduction in total system torque as the amount of mass which must be accelerated is reduced. As a result, drive shaft speed may be increased substantially without increasing shaft winding or harmonic vibration, as discussed above.

Having eliminated turret mass as a source of drive shaft torque, a second constraint on drive shaft speed must be examined: process planning. That is, regardless of the extent to which drive shaft speed can be increased without torque problems, certain practical considerations limit cycle speed.

The process planning limit is the time required to perform the most time-consuming function on one workpiece at maximum drive shaft speed. For example, the sidewall folding and bottom finish stations typically require more time than the other stations in the manufacture of a cup. For present purposes, the folding statiod, which requires approximately 0.12 seconds, for example, is the process planning limit.

Regardless of whether a single or a multiple turret machine is used, the last work station is generally the exhaust station, whereat the workpiece is transferred from the turret. Since all work stations are typically controlled by and synchronized with respect to the drive shaft, each operates on a 360 degree machine cycle; i.e., each station performs one complete function on one mandrel during each 360 degree revolution of the main drive shaft. Thus, one workpiece (cup) is produced, i.e., exhausted from the cup-making machine, per each drive shaft revolution. As explained below, however, although each station operates on a 360 degree cycle, each station function need not be temporally coincident. That is, although each station operates once per drive shaft revolution, different stations may commence functioning at different angular positions of the drive shaft. In any event, the ultimate objective of increasing cup production per unit time requires increased drive shaft speed, limited by the time each mandrel must engage the most time consuming (e.g., folding) station.

As discussed above with reference to FIG. 4, the main drive shaft (not shown) cooperates with driver 342 and drive gear 346 to impart angular motion to hub 314 and turret standard 202. As a result, mandrel turret 10 makes one complete revolution about its longitudinal axis for every "n" 360 degree drive shaft revolutions, "n" being the number of mandrels disposed about the turret. Consequently, it is the 360 degree revolution of the main drive shaft, not the turret, upon which the cup-making cycle is predicated.

The 360 degree cup-making cycle can be broken up into two components: 1) the "time", expressed in degrees, required to move the workpiece from one station to the next; and 2) the "time" the workpiece remains at each station. These components are referred to, respectively, as the "index" and "dwell" portions of the cycle.

In a conventional indexing turret, for example, 160 degrees of drive shaft rotation may be required to index a mandrel from one station to the next, leaving 200 degrees of drive shaft rotation during which the mandrel engages each workstation (dwell). As drive shaft speed increases, the portion of drive shaft rotation allotted to dwell must increase to maintain the same dwell time. A minimum dwell time of 0.12 seconds must be maintained. Hence, maximizing drive shaft speed requires maximizing that portion of the 360 degree cycle allotted to dwell.

Stated another way, production rates rise as the ratio of dwell to index is maximized, for example, when a 360-degree cycle comprises 250 degrees of dwell and 110 degrees of index in comparison to the earlier example. However, indexing all mandrels while simultaneously positioning all work stations in anticipation of dwell would produce unacceptably high system loads at high drive shaft speeds if done during collective segments as little as 110 degrees of drive shaft rotation. To relieve the loading problem, indexing the mandrels and workstations may be spread out over an entire cycle.

The previously discussed cam/linkage mechanism allows for independent positioning of the mandrels. Further, although each work station functions on a 360 degree main drive shaft cycle, the cycles need not coincide. By staggering work station cycles and advancing fewer than all mandrels at a time, the loads due to rapid indexing may be effectively distributed throughout each cycle, thereby minimizing peak loads.

Consider, for example, a turret of the present invention having an equal number of mandrels and associated work stations. As the first work station terminates engagement with the first mandrel, the mandrel quickly advances toward the second work station. As the first mandrel approaches the second work station, the second station terminates engagement with the second mandrel and the first mandrel replaces the second mandrel at the second work station. The second mandrel advances to the third station to replace the third mandrel, and the process continues. By properly staggering station cycles and mandrel advancement, station dwell time can be maximized and index time minimized if, as described above, the incoming mandrel is disposed immediately proximate a particular station as that station terminates engagement (dwell) with the outgoing mandrel. Moreover, system loads are reduced because selected mandrels are accelerated independently, preferably only one at a time, to advantageously reduce instantaneous torque.

At this stage, a further advantage of the present invention becomes apparent. In the above example, the first station remains unoccupied as each mandrel serially advances to adjacent stations until the last mandrel leaves the last station and engages the first station. It is possible to equip a turret with more mandrels, for example, one or two, or more, than the number of associated work stations. In this way, an incoming mandrel may always be proximate each station as that station terminates engagement with the outgoing mandrel, so that the indexing time for each station is minimized. As a further advantage of the additional mandrels, work station utilization is maximized, i.e., a workpiece is processed at each station at all times except for the period during which the incoming mandrel is substituted for the outgoing mandrel.

For example, consider a 4 station, 5 mandrel turret. Each station works on a 360 degree drive shaft cycle so that, during continuous operation, 5 cups are produced for every 5 drive shaft revolutions. As the machine operates through 5 cycles, the drive shaft rotates 1800 degrees, during which each station processes 5 mandrels. Each station, therefore, is "associated" (index plus dwell) with each mandrel for 1800/5=360 degrees. However, each mandrel is associated with each station for 1800/4=450 degrees. There being a 250 degree dwell at each station, each mandrel thus has 200 degrees (i.e., 450 minus 250) of drive shaft rotation available for indexing. Thus, through proper programming of the control means, the mandrels are liberated from the 360 degree drive shaft cycle, thereby obviating the tradeoff between index and dwell at each station. The portion of each 360 degree station cycle attributable to dwell is maximized, yet the number of degrees in which the mandrels must index is not reduced and, indeed, may be increased, because of the presence of the additional mandrel.

The additional indexing time distributed to each mandrel is a function of the ratio of mandrels to stations. For example, a seven mandrel, six station turret provides 420 degrees (7/6 times 360) of total indexing and dwell time for each mandrel. At drive shaft speeds which require 250 degrees of dwell to accommodate a 0.12 second process planning limit, this yields 170 degrees (420 minus 250) in which to index each mandrel.

As a further example, a ten mandrel, eight station turret provides 450 degrees (10/8 times 360) of indexing plus dwell for each mandrel Again, for 250 degrees of dwell, each mandrel has 200 degrees of drive shaft rotation available for indexing.

Independent advancement of selective mandrels may be advantageously employed in any environment in which workpieces are serially placed in interactive zones; for example, in manufacturing and machining operations utilizing numerical control, particularly where some operations require more time to perform than others. Likewise, packaging operations may be performed more efficiently by independently advancing the articles through each work station. By way of further example, efficiency and productivity in the manufacture of semiconductor devices may be greatly enhanced via the foregoing techniques.

Additionally, the "program" by which the control means positions the mandrels need not be limited to a cam track. Alternatively, the program may be embodied in a chip, magnetic disc, or minicomputer, and retrieved and utilized using techniques known to those skilled in the art. In this way, a new program may be implemented, for example by entry through a keyboard, without having to replace the cam.

Furthermore, the functions performed by the linkages described herein may suitably be performed by, for example, pneumatic or hydraulic servo mechanisms, or electronic or magnetic actuators.

While the invention has now been described with reference to certain preferred embodiments, those skilled in the art will appreciate that certain modifications, changes and omissions may be made without departing from the spirit thereof. For example, although the drive shaft is depicted herein as a rotating shaft, it may comprise any suitable means for controlling the synchronisation of the cyclic events such as an electronic controller. In addition, the arms extending from the turret may comprise the work stations, and workpieces may be disposed about the periphery of the turret. Although a preferred embodiment of the present invention has been described in the context of a cup making machine, the invention broadly contemplates applications in which mating elements intermittently experience mechanical, thermal, optical, acoustic, or electrical engagement, for example. Accordingly, it is intended that the scope of the present invention be limited solely by the claims granted herein.

I claim:

1. An indexing assembly including a turret, at least one mandrel in operative association therewith, means for rotating said turret about an axis of rotation at a continuous angular velocity, and means for imparting programmed, intermittent periods of angular acceleration, angular deceleration, and absolute dwell to said mandrel with respect to a fixed point in space proximate said assembly.

2. The indexing assembly of claim 1, wherein said continuous angular velocity is generally constant angular velocity.

3. A mechanically programmed turret assembly comprising:
   a frame;
   a standard rotatably mounted within said frame and having a hub rigidly secured thereto;
   drive means for rotating said standard at a continuous angular velocity;
   mounting means for rotatably mounting at least one mandrel about the axis of rotation of said standard; and
   control means, operatively associated with said drive means, for imparting intermittent periods of motion and absolute dwell to said mandrel relative to a fixed point in space proximate said assembly.

4. The turret assembly of claim 3, wherein said control means comprises linkage means for controlling said angular velocity of said mandrel to effect intermittent periods of acceleration, deceleration, and dwell.

5. The turret assembly of claim 4, wherein said continuous angular velocity is generally constant angular velocity.

6. The turret assembly of claim 5, wherein said control means includes cam means rigidly secured to said frame and said linkage means comprises a transfer member pivotably disposed in said hub to establish a constant distance between said axis of rotation and said transfer member.

7. The turret assembly of claim 6, wherein said linkage means further comprises:
   a first link having a proximal end rigidly secured to said transfer member and a distal end pivotably secured to said mandrel; and
   a second link, having a proximal end secured to said transfer member and a distal end operatively associated with said cam means.

8. The turret assembly of claim 7, wherein said distal end of said first link is slidably secured to said first mandrel.

9. The turret assembly of claim 7, wherein:
   said cam means comprises a generally flat disc having a cam track disposed thereon; and
   said distal end of said second link includes a follower for facilitating operative association between said cam track and said second link.

10. The turret assembly of claim 5, further comprising a plurality of mandrels rotatably mounted about said axis of rotation, wherein said control means controls the angular position and angular velocity of said mandrels with respect to each other and with respect to said axis of rotation.

11. The turret assembly of claim 10, wherein each of said mandrels experience predetermined intermittent periods of angular acceleration, angular deceleration, and absolute dwell in response to said linkage means.

12. The turret assembly of claim 10, wherein the angular velocity and the angular position of a selected mandrel is independent of the angular velocity and angular position of any other mandrel.

13. The turret assembly of claim 5, wherein said standard comprises a generally cylindrical shaft having a vertical axis of rotation.

14. The turret assembly of claim 5, wherein said control means is responsive to said means for rotating said standard.

15. An indexing assembly, comprising a turret rotatably mounted in a frame, the turret having a hub rigidly secured thereto and configured to rotate at a continuous angular velocity with respect to said frame, said indexing assembly further comprising control means, cooperating with said hub, for applying a variable torque to a mandrel configured to rotate about the axis of rotation of said turret, such that said mandrel experiences intermittent periods of angular acceleration, angular deceleration and motionlessness with respect to a fixed point in space proximate said assembly in response to said application of said variable torque.

16. The indexing assembly of claim 15, wherein said continuous angular velocity is generally constant angular velocity.

17. The assembly of claim 16, wherein said control means comprises a linkage means cooperating with said hub, for controlling said variable torque supplied to said mandrel.

18. The assembly of claim 17, wherein said control means further comprises a cam means for programmably controlling said linkage means.

19. The assembly of claim 17, wherein said control means further comprises a transfer member pivotably disposed in said hub and further wherein said linkage means comprises a first link having a proximal end connected to said transfer member and a distal end cooperating with said mandrel, and a second link, having a proximal end connected to said transfer member and a distal end cooperating with said control means.

20. The assembly of claim 17, wherein said linkage means transmits said variable torque to said mandrel in response to said constant angular velocity of said hub.

21. The assembly of claim 19, wherein said cam means comprises a generally flat disc having a cam track disposed thereon, said disc being rigidly secured to said frame.

22. The assembly of claim 21, wherein said distal end of said second link comprises a cam follower, said cam follower cooperating with and positioned by said cam track.

23. The assembly of claim 15, wherein said control means comprises means for varying the magnitude of said variable torque between a first predetermined value less than zero and a second predetermined value greater than zero, inclusive of zero, in a predetermined fashion.

24. The assembly of claim 19 wherein said control means is configured such that the instantaneous magnitude of said variable torque is a function of the relative positions of said first and second links and said substantially constant angular velocity.

25. The assembly of claim 22 wherein said control means is configured such that said cam follower follows said cam track in response to said substantially constant angular velocity of said hub, thereby causing said distal end of said second link to impart said variable torque to said mandrel.

26. The assembly of claim 21, wherein:

said transfer member is configured to rotate about said axis of rotation at said substantially constant angular velocity; and said control means is configured to control the position of said distal end of said second link such that said distal end of said first link cooperates with said mandrel to impart said variable torque thereto in accordance with the contour of said cam track.

27. The assembly of claim 15, further comprising:
a second mandrel disposed for rotation about said axis of rotation;
wherein a second linkage means cooperates with said hub and said second mandrel to impart a second variable torque thereto.

28. The assembly of claim 27, wherein said second mandrel experiences intermittent angular acceleration, angular deceleration and absolute dwell in response to said second variable torque.

29. The assembly of claim 27, wherein said first variable torque is independent of said second variable torque.

30. The assembly of claim 27, wherein the angular position of said first mandrel about said axis of rotation is independent of the angular position of said second mandrel.

31. The assembly of claim 27, wherein said second mandrel is rotatably mounted to said turret.

32. The assembly of claim 15, wherein said mandrel is rotatably mounted to said turret about the axis of rotation thereof.

33. In an indexing apparatus for intermittently positioning a mandrel at dwell, said apparatus comprising a turret, a mandrel connected to said turret, and means for rotating said mandrel and said turret about a common axis; the improvement comprising:
means for intermittently maintaining said mandrel motionless with respect to a fixed point in space proximate said apparatus while said turret rotates about said axis at a continuous angular velocity.

34. The indexing apparatus of claim 33, wherein said continuous angular velocity is generally constant angular velocity.

35. The apparatus of claim 34, wherein the mass of said first mandrel is less than the mass of said turret assembly.

36. The apparatus of claim 35, wherein said mass of said turret assembly is greater than twenty times said mass of said mandrel.

37. A cam biased indexing turret, comprising:
a frame;
a cylindrical standard rotatably mounted within said frame;
drive means, affixed to said standard, for imparting a first determined angular velocity to said standard with respect to said frame;
a mandrel, rotatably mounted to said standard such that the axis of rotation of said mandrel is coincident with the axis of rotation of said standard;
linkage means, cooperating with said mandrel, for imparting a second predetermined angular velocity to said mandrel, said linkage means comprising a cam follower and a pivot member having a mounting mechanism configured to allow pivotal motion of said pivot member;
hub means, rigidly secured to said standard, for retaining said pivot member mounting mechanism at a constant distance from said axis of rotation, said pivot member mounting mechanism rotating about said axis of rotation at said first predetermined angular velocity; and
track means for guiding said cam follower as said pivot member mounting mechanism rotates about said axis of rotation to thereby impart pivotal motion to said pivot member and said second angular velocity to said mandrel.

38. An indexing turret, comprising:
a frame member having an integral cam track formed on a surface thereof;
a standard, rotatably mounted within said frame and having a first and a second end;
a drive gear mounted on said first end of said standard for imparting a predetermined constant angular velocity to said standard;
a hub member, rigidly mounted to said standard and having a bore extending therethrough, the axis of said bore being perpendicular to the plane of said hub;
a pivot member, rotatably mounted in and extending through said bore, said pivot member having a follower end operatively associated with said cam track, and a connecting end;
a mandrel, rotatably mounted on said second end of said standard, such that the axis of rotation of said mandrel is coincident with the axis of rotation of said standard;
a first link having a first end operatively associated with said connecting end of said pivot member and having a second end operatively associated with said mandrel;
wherein, in response to said predetermined constant angular velocity of said standard, said drive gear, said hub and said pivoting member rotate about said axis of said standard at said constant angular velocity, and said mandrel rotates about said axis of said standard at a variable angular velocity, said variable angular velocity being determined by said cam track, said pivoting member and said first link.

* * * * *